United States Patent [19]

Griffiths

[11] 4,051,533

[45] Sept. 27, 1977

[54] SIGNAL PROCESSOR FOR REDUCING INTERFERENCE BETWEEN FREQUENCY-MODULATED SIGNALS

[76] Inventor: Frank Anthony Griffiths, 105 Hillcroft Crescent, Oxhey, Hertfordshire, England

[21] Appl. No.: 725,281

[22] Filed: Sept. 21, 1976

[30] Foreign Application Priority Data

Sept. 24, 1975 United Kingdom ............... 39195/75

[51] Int. Cl.$^2$ .................... H04N 7/06; H04B 15/00
[52] U.S. Cl. .................... 358/167; 179/15 AN; 325/47; 325/65; 358/38; 358/143; 360/19
[58] Field of Search ............ 325/47, 65, 145, 156, 325/345; 179/15 AN, 15 BP, 15 FD; 343/200; 358/4, 38, 127–129, 167, 143; 360/18–20, 30, 33

[56] References Cited

U.S. PATENT DOCUMENTS

| | | | |
|---|---|---|---|
| 3,371,154 | 2/1968 | Frohbach et al. | 358/143 |
| 3,521,177 | 7/1970 | De Niet | 358/167 |
| 3,548,085 | 12/1970 | Shimada | 358/143 |
| 3,800,100 | 3/1974 | Runge | 358/127 |
| 3,830,968 | 8/1974 | Redlich et al. | 360/19 |

Primary Examiner—Robert L. Griffin
Assistant Examiner—Marc E. Bookbinder

[57] ABSTRACT

A method of reducing the interference between the sideband of a first carrier which is frequency-modulated by a video signal and a second carrier which is frequency-modulated by an audio signal, comprising increasing the amplitude of the second carrier signal and decreasing at least those sideband components of the first carrier in the region of the second carrier as those components tend to increase to interfere with the second carrier.

6 Claims, 4 Drawing Figures

FIG. I.

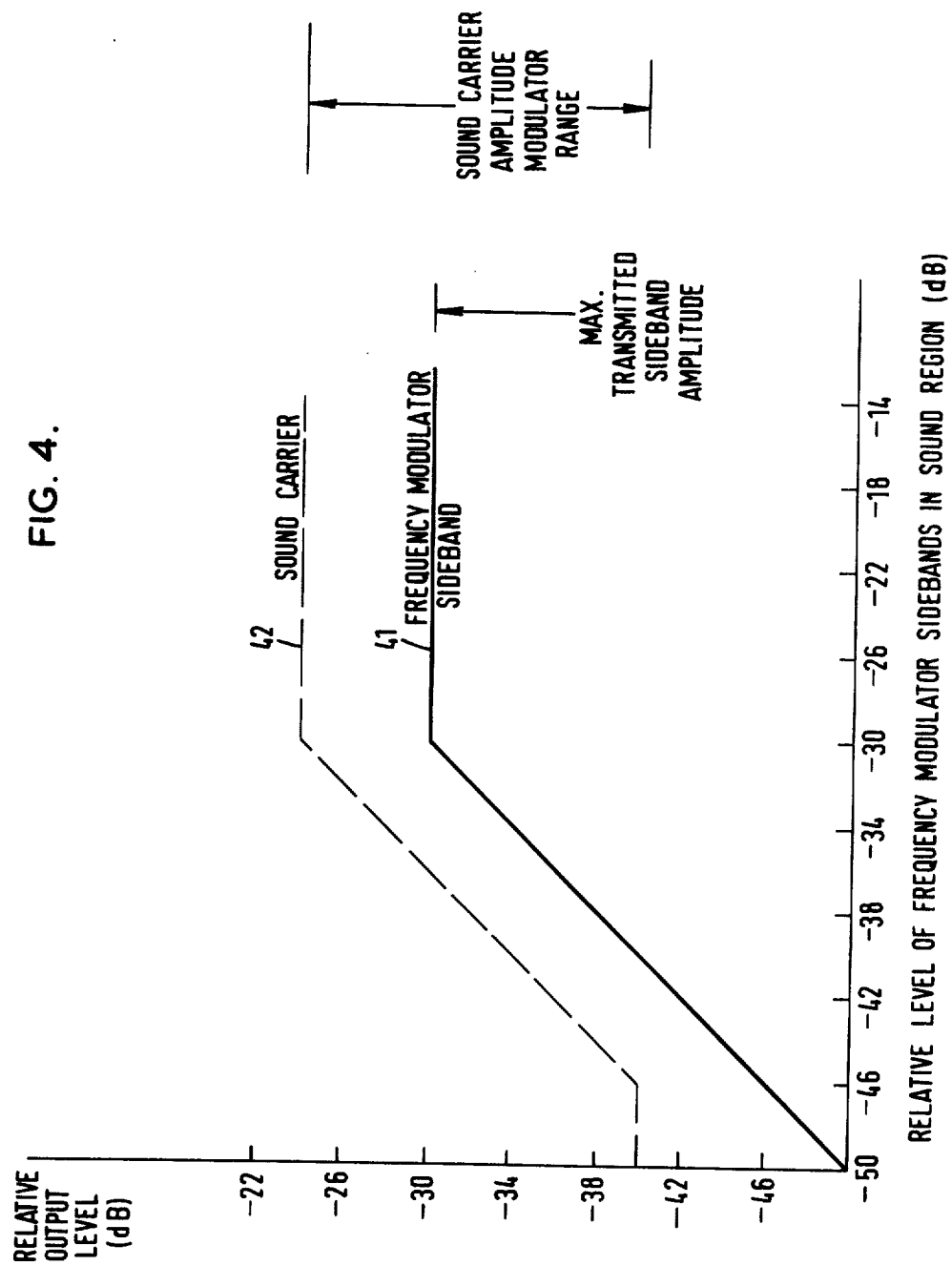

SIGNAL PROCESSOR FOR REDUCING INTERFERENCE BETWEEN FREQUENCY-MODULATED SIGNALS

BACKGROUND OF THE INVENTION

This invention relates to the processing of television signals and in particular to the reduction of interference between two frequency-modulated signals. The invention is primarily intended for use in the reduction of interference between two carrier signals which are modulated in frequency in accordance with a video signal and an audio signal respectively and which necessarily occupy partially overlapping ranges of frequencies because they must be accommodated within a limited bandwidth. The process of frequency modulation produces many sideband components and it is not in general possible to avoid interference between the sidebands of the frequency modulated signals merely by reducing the bandwidth of, for example, the modulating video signal. The invention is particularly intended for use in recording in video signal and an audio signal on the same track of a video disc.

The state of the art is illustrated by U.S. Pat. No. 3,830,968 which discloses the increase of the amplitude of an audio carrier when it is disturbed by sideband components of the video carrier. Such an increase is often excessive and can aggravate the mutual interference of the sidebands.

SUMMARY OF THE INVENTION

It is, according to the present invention, proposed that the sideband components of the primary signal, that is to say the video carrier signal or, in general, the signal having the greater content of information, be detected at least for the region of the secondary signal (that is to say the audio carrier signal) to provide a control by means of which, as the amplitude of the said sideband components of the primary signal increases, the amplitude of the secondary signal is increased and the said sideband components of the primary signal are attenuated. Preferably the control is non-linear; it is preferably ineffective to attenuate the said sideband components until the amplitude of those sideband components exceeds a selected level and it is preferably effective to limit the maximum amplitude of the interfering signals.

DESCRIPTION OF THE DRAWINGS

FIG. 4 is a graphical representation of the control exerted by the processor.

DESCRIPTION OF THE PREFERRED EMBODIMENT

Figure 1:
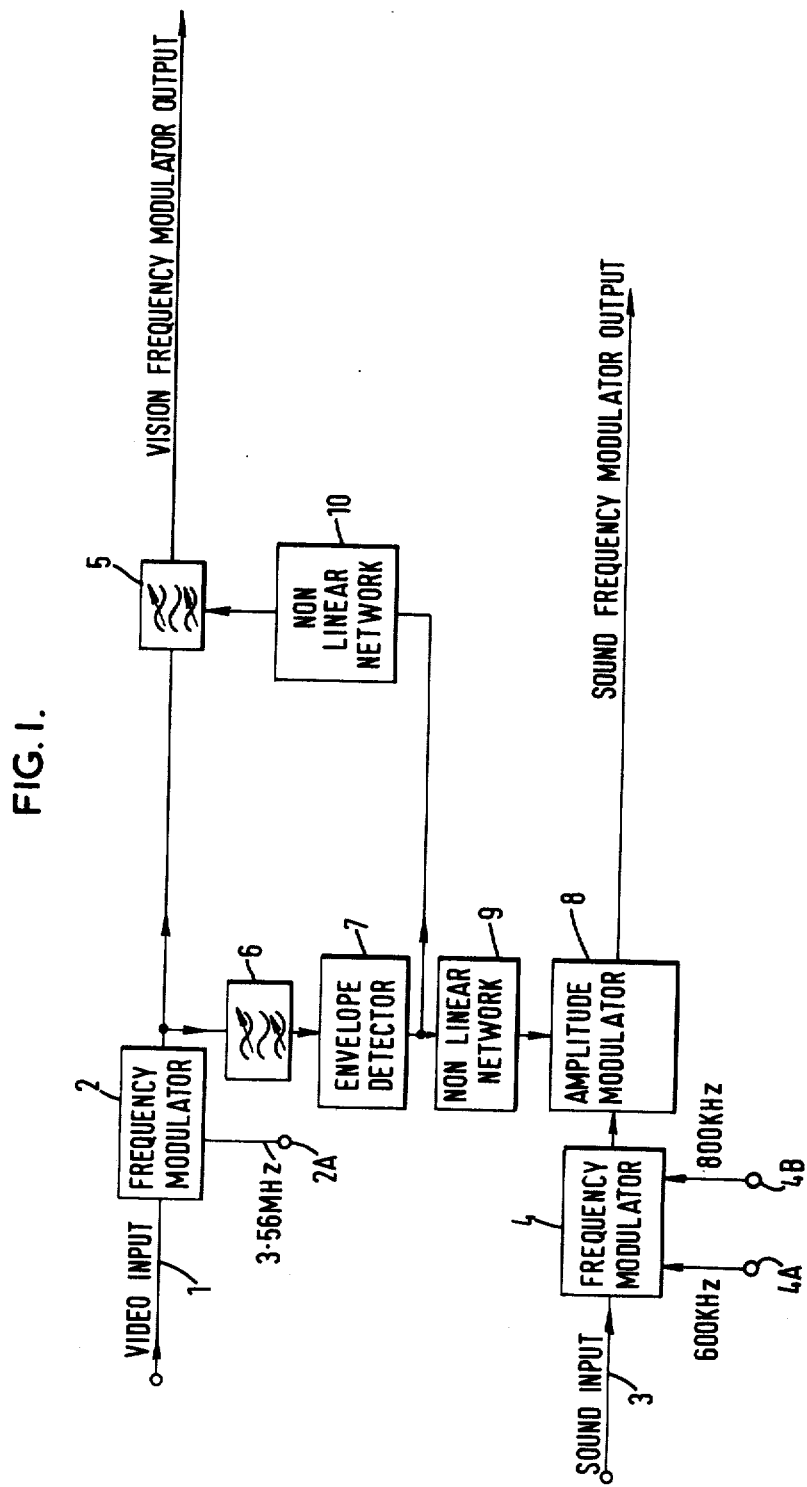
FIG. 1 is a schematic diagram of a television signal processor.

The exemplary processor illustrated in FIG. 1 is designed for a television-signal recording system in which a video signal is conveyed as a modulation of the frequency of a carrier signal nominally of approximately 3.56 megahertz and in which audio signals are conveyed as modulations of the frequencies of two carrier signals of 600 kilohertz and 800 kilohertz respectively. The carrier signal for the video signal deviates from 2.7 megahertz to 4.2 megahertz, the upper sideband being vestigial. The lower sideband of the video carrier extends well beyond the lower limit of the deviation of the carrier and into the region of the audio carriers. However, the upper sideband components that correspond to those lower sideband components which are in the region of the audio carriers and their sidebands are not transmitted because the total bandwidth is restricted. The video carrier has therefore effectively only a single sideband in respect of those components which may suffer interference.

A video signal is received at an input terminal 1 and is fed therefrom to a modulating input of a modulator 2 which modulates the frequency of a carrier signal, which is supplied at a frequency of 3.56 megahertz from a source 2A. An audio input signal is received at an input terminal 3 and is fed therefrom to a modulating input of a modulator 4 which modulates the frequencies of the two audio carriers which are supplied at frequencies of 600 kilohertz and 800 kilohertz from sources 4A and 4B respectively. As thus far described the processor is commonplace.

The frequency-modulated video carrier is fed to a filter 5, which will be described in more detail later, and also through a band-pass filter 6 to a detector 7. The band-pass filter 6 allows the passage only of those signal components which are in the region of the modulated audio carrier. In this example the pass-band of the filter embraces the frequencies 600 and 800 kilohertz, its extent above and below those frequencies being a matter of choice. The detector, which may be of commonplace form, detects the envelope of these components and produces a direct signal which denotes the amplitude of the signal constituted by the aforementioned components. Increasing amplitude of these components, and accordingly increasing potential interference with the audio carriers' sidebands, is therefore denoted by an increasing magnitude of this direct signal, which is used as a control signal for both the filter 5 and an amplitude modulator 8. As the control signal increases, it causes the filter 5 to attenuate at least the excessive sideband components in the region of each audio carrier and causes the modulator to amplify the amplitude of each audio carrier, or at least its sideband components. Both actions reduce the interference which may exist between the sidebands of the video carrier and each audio carrier when the frequency modulated video and audio carriers are ultimately combined into a composite signal for transmission or recording. The attenuation of the video carriers' sideband components permits the use of a lower maximum amplitude of the audio carrier than would be feasible if only the amplitude of the audio carrier were adjusted to counteract interference by the components of the video carriers' sideband.

The control of the amplitude modulator 8 and the filter 5 by the control signal could be linear. Preferably however the processor includes non-linear networks 9 and 10 interposed between the detector 7 and the modulator 8 and between the detector 7 and the filter 5 respectively. The network 9 may be realised in any convenient manner to limit the effective range of control, and thereby, for example, to cause modulation of the amplitude of the frequency-modulated audio carrier only when the control signal exceeds a threshold and to limit the maximum amplitude of the frequency-modulated audio carrier. The network 10 may be realised in any convenient manner to allow the attenuation of the video carrier or the relevant part of the sideband thereof only when the amplitude of the audio carrier approaches its maximum. In general, this manner of control allows the transmission of a maximum of information in the video carriers' sidebands.

In practice, the two networks 9 and 10 may be readily realised to produce the performance which is illustrated by FIG. 4, which is a graph of relative output levels against the relative level of FM sideband components in the audio region. The network 9 passes the detected signal to the modulator 8 while the detected signal denotes relative amplitudes greater than −46 decibels and smaller than −30 decibels (dB) below the level of the video carrier signal. Accordingly, for these amplitudes, the relative amplitude of the audio carrier is linearly modulated between its minimum level of −40 dB relative to the video carrier and its maximum level of −24 dB relative to the video carrier. The network 9 limits the output value of the control signal so that the level of the audio carrier is maintained at −24 dB when the relative amplitude of the detected video sidebands is greater than −30 dB. The network 10 allows the control of the filters 5 by the detected video sideband components only when the relative amplitude thereof exceeds −30 dB. Thereupon the filter 5 maintains the video carrier's sidebands at a fixed level. Because the level of interference is thereby fixed, it is readily possible to ensure that the audio carrier is always at least 6 dB above the interference, as is shown in FIG. 4.

In FIG. 4, the line 41 denotes the relative amplitude of the video carrier's sideband and the line 42 the relative amplitude of the audio carrier.

Figure 2:
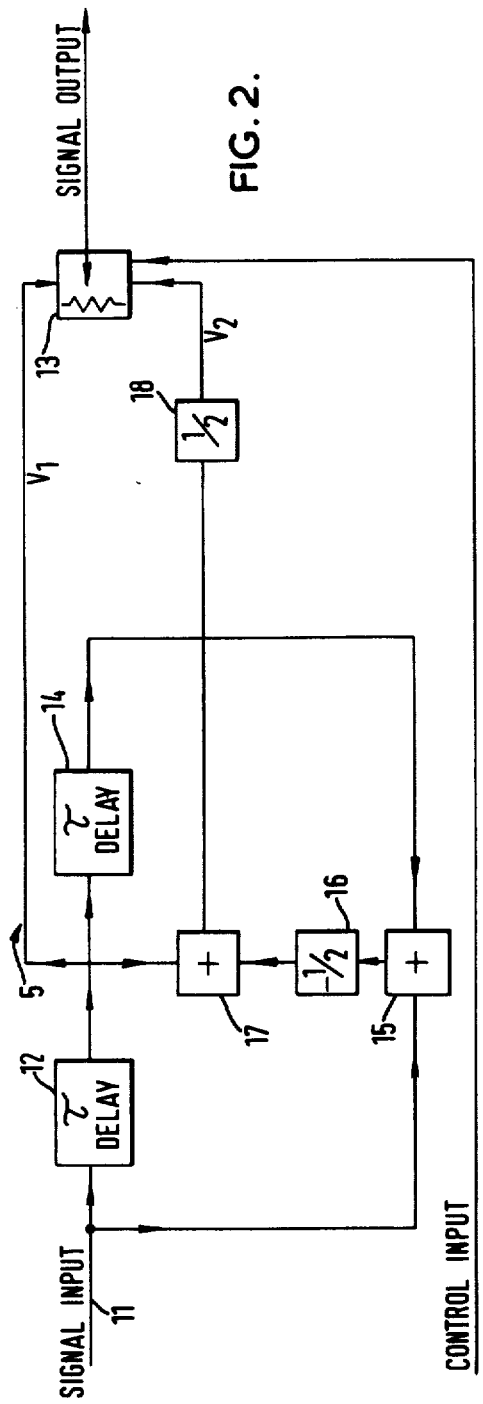
FIG. 2 is a schematic diagram of a filter which may constitute part of the processor.

FIG. 2 illustrates a suitable form of the filter 5. This filter is a variable band-pass filter which has two channels, one of which passes all the frequencies of the video bandwidth equally and the other of which attenuates the sideband frequencies relative to the central or nominal frequency of the video carrier. The control signal controls the proportions in which the outputs ($V_1$ and $V_2$ respectively) of these channels are mixed.

The frequency-modulated video carrier is received at an input terminal 11 of the filter 5 and passes through a delay 12 both to one input of an additive variable mixer 13 and, through a second delay 14, to one input of an adder 15. This adder also receives the input signal and feeds the combination of its inputs through an amplifier 16 which reduces the amplitude of the combination by one half and inverts it. The output of the amplifier 16 is added to the once-delayed input signal by an adder 17 of which the output is diminished by one half by an attenuator 18. The resultant signal ($V_2$) is fed to the second input of the additive mixer 13.

Figure 3:
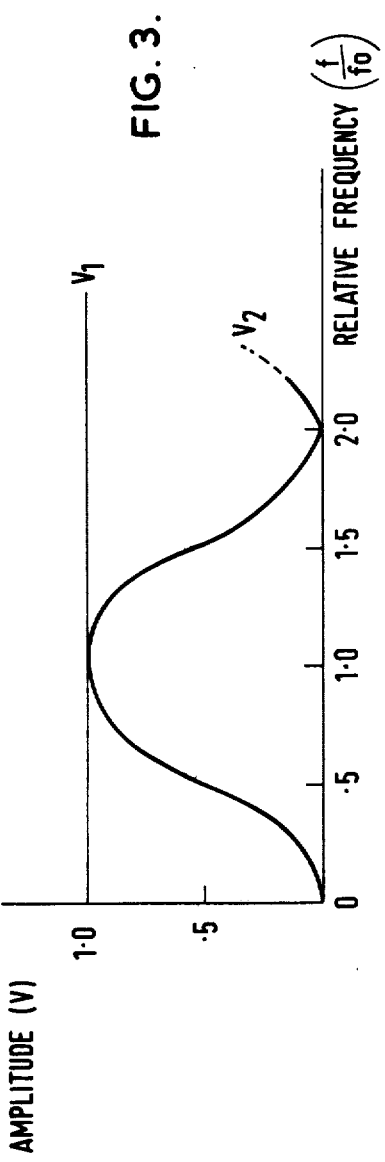
FIG. 3 is a graphical diagram of the frequency response of the filter.

Normally, that is to say in the absence of interference, the mixer will feed the signal $V_1$ to an output terminal but an increasing control signal will introduce an increasing proportion of the signal $V_2$ into the output of the mixer 13. FIG. 3 is a diagram illustrating the amplitude versus frequency characteristics of the signals $V_1$ and $V_2$. The normalised amplitude of the signal $V_1$ is 1.0 for all material frequencies whereas the amplitude of the signal $V_2$ varies as $1/2 (1-\cos \pi f/fo)$ wherein $fo$ is the centre of the range of deviation of the video carrier and $f$ is the actual frequency of the signal. Other characteristics for the filter may be suitable; for example, it could produce attenuation only for the region of the audio carrier. In general the filter should introduce a constant delay.

I claim:

1. A method of reducing the interference between a primary frequency-modulated carrier signal and a secondary frequency-modulated carrier signal, comprising both increasing the amplitude of the secondary frequency-modulated carrier signal and decreasing at least those sideband components of the primary carrier signal in the region of the secondary carrier signal as those sideband components tend to increase to interfere with the secondary carrier signal.

2. A method according to claim 1 in which the primary signal is modulated by a video television signal and the secondary signal is modulated by an audio signal.

3. A method according to claim 1, in which, when the amplitude of the said sideband components is below a predetermined threshold, the amplitude of the secondary carrier signal increases in accordance with increasing amplitude of the said sideband components and, when the amplitude of the said sideband components is above the said threshold, this amplitude is limited to be less than the amplitude of the secondary carrier signal.

4. A processor for the reduction of interference between a primary frequency-modulated signal and a secondary frequency modulated carrier signal, comprising a detector for detecting the amplitude of sideband components of the primary carrier signal in the region of the secondary carrier signal;

a modulator for modulating the amplitude of the secondary carrier signal;

a filter for controlling at least the said sideband components of the primary carrier signal; and means for controlling both the modulator and the said filter in response to the detected amplitude of the said components so as, respectively, to increase the amplitude of the secondary carrier signal as the amplitude of the said sideband components increases and to decrease the amplitude of said sidebands at least when those sidebands tend to exceed a threshold.

5. A processor according to claim 4, in which the detector provides for the filter and the modulator a control signal representing the detected amplitude of the said sidebands, and further comprising non-linear networks interposed between the detector and the filter and modulator respectively, said networks rendering the filter ineffective to attenuate said sidebands below said threshold and the modulator effective to limit the maximum amplitude of the secondary carrier signal.

6. A processor according to claim 4, in which the filter comprises first and second channels, of which the first passes all the components of the primary signal indiscriminately and of which the second attenuates the sideband frequencies relative to the central frequency of the primary signal, and an additive mixer which adds the signals passing through the second channel to the signals passing through the first channel in increasing proportion as the said detected amplitude increases.

* * * * *